United States Patent [19]
Ledger

[11] Patent Number: 5,293,214
[45] Date of Patent: Mar. 8, 1994

[54] APPARATUS AND METHOD FOR PERFORMING THIN FILM LAYER THICKNESS METROLOGY BY DEFORMING A THIN FILM LAYER INTO A REFLECTIVE CONDENSER

[75] Inventor: Anthony M. Ledger, New Fairfield, Conn.

[73] Assignee: Hughes Aircraft Company, Los Angeles, Calif.

[21] Appl. No.: 891,344

[22] Filed: May 29, 1992

Related U.S. Application Data

[63] Continuation-in-part of Ser. No. 804,872, Dec. 6, 1991.

[51] Int. Cl.[5] .............................................. G01B 9/02
[52] U.S. Cl. .................................. 356/355; 356/357; 356/360
[58] Field of Search ............... 356/355, 357, 359, 360, 356/345

[56] References Cited

U.S. PATENT DOCUMENTS

| | | | |
|---|---|---|---|
| 4,725,144 | 2/1988 | Nelson et al. ...................... | 356/360 |
| 4,932,781 | 6/1990 | Kuwayama ........................ | 356/355 |

FOREIGN PATENT DOCUMENTS

| | | | |
|---|---|---|---|
| 0051707 | 3/1991 | Japan ................................. | 356/355 |
| 1672213 | 8/1991 | U.S.S.R. ............................ | 356/355 |

*Primary Examiner*—Samuel A. Turner
*Attorney, Agent, or Firm*—Michael W. Sales; Wanda K. Denson-Low

[57] ABSTRACT

An apparatus (1) that measures the thickness of a thin film layer of a wafer (24), includes a filtered white light source that forms a monochromatic light beam. The white light source includes a halogen lamp (10), a condensing lens (12), a circular aperture (14), a collimator lens (16), a narrow band filter wheel (18), and a second collimator lens (20). The monochromatic light beam generated by this filtered white light source illuminates an entire surface of the wafer (24). Prior to illumination, the wafer (24) is deformed into a reflective condenser. Thus, the monochromatic light beam that illuminates the wafer (24) is reflected off the wafer (24) and collected by an optical scheme that redirects the beam to a detector array (31) of a charge coupled device (CCD) camera (30). The monochromatic light beam incident upon the CCD camera detector array (31) contains an image of an interference fringe pattern that is formed by coherent interactions in the monochromatic light beam as it is reflected within the wafer structure (24). The interference fringe pattern image is displayed on the CCD camera detector array (31) and captured by the CCD camera (30). The captured image is then converted to a map of measured reflectance data by a digitizing circuit (34) and a computer (36). This map of measured reflectance data is then compared to reference reflectance data to generate a map of the thin film layer thickness over a full aperture of the wafer (24).

52 Claims, 6 Drawing Sheets

APPARATUS AND METHOD FOR PERFORMING THIN FILM LAYER THICKNESS METROLOGY BY DEFORMING A THIN FILM LAYER INTO A REFLECTIVE CONDENSER

CROSS-REFERENCE TO RELATED APPLICATIONS

This application is a continuation-in-part application of U.S. patent application Ser. No. 07/804,872, entitled, Apparatus and Method for Measuring the Thickness of Thin Films, filed on Dec. 6, 1991, now pending and assigned to the assignee hereof.

BACKGROUND OF THE INVENTION

1. Field of the Invention

The present invention relates to an apparatus and method for performing thin film layer thickness metrology and, more particularly, to an apparatus and method for performing thin film layer thickness metrology on a silicon/silicon dioxide/silicon ($Si/SiO_2/Si$) structured semiconductor wafer by deforming the wafer into a reflective condenser.

2. Description of the Prior Art

In one particular application wherein the present invention is especially practical, a silicon-on-insulator (SOI) semiconductor wafer, typically consisting of an $Si/SiO_2/Si$ sandwich structure, is fabricated by growing a silicon dioxide ($SiO_2$) film on one surface of each of two silicon (Si) wafers and bonding the two silicon dioxide film surfaces together at high temperature. It should be noted that other materials, silicon nitride for example, may be used for the insulator material, and that other materials may be used for the wafer material. In such an application, an outer surface of one of the two silicon wafers in the sandwich structure is mechanically ground and polished to an average thickness of several microns. This mechanical grinding and polishing unfortunately results in large spatial variations in the thickness of this one silicon wafer, or this outer silicon layer. To reduce these spatial variations, a thickness error map that indicates thickness non-uniformities in this outer silicon layer over the entire wafer surface is require, for example, to initialize a further micropolishing process.

A sequence of measuring the spatial variations in the thickness of the outer silicon layer followed by thinning and smoothing the surface of this layer by micropolishing may need to be performed several times before the entire outer silicon layer achieves a desired thickness. In order to reduce costs and increase production, a measurement of at least 400 points on a wafer surface in 60 seconds is desirable.

Current commercial instruments, however, can typically provide a thickness measurement of a thin film layer at only a single point thereon. These instruments use a focused lens or a fiber bundle to locally illuminate a surface of the thin film layer with a beam of monochromatic light, and a grating or prism spectrograph to measure the surface spectral reflectance at each point. In all cases, this surface spectral reflectance data must be numerically corrected due to variations in the angle of incidence caused by the f-number of the illuminating beam.

Current commercial instruments may be extended to cover an entire thin film layer, such as an outer silicon layer of an SOI semiconductor wafer, by moving either the measuring instrument or the wafer in a controlled manner. However, the time required for these instruments to determine the thickness of an outer silicon layer of an SOI semiconductor wafer at a single point on the outer silicon layer is on the order of several minutes, and characterizing the entire outer silicon layer with at least 400 measurement points far exceeds the time desired for efficient wafer production. It is therefore desirable to perform thin film layer thickness metrology over an entire thin film layer, such as an entire outer silicon layer of an SOI semiconductor wafer, in an efficient, albeit an economical and highly accurate manner.

SUMMARY OF THE INVENTION

The present invention contemplates an apparatus and method for efficiently determining a thin film layer thickness of, for example, an entire thin film layer of a semiconductor wafer. Non-uniformities in the thickness of this thin film layer obtained by measuring the reflectance characteristics over a full aperture of a surface of the wafer, and comparing this measured reflectance data to reference reflectance data by using numerical iteration or by using a calibration wafer having known thin film layer thicknesses.

To efficiently measure the reflectance characteristics over a full aperture of a semiconductor wafer surface, a filtered white light source is used to produce a series of monochromatic light beams at several different wavelengths. These monochromatic light beams are sequentially projected onto an entire surface of the wafer, resulting in coherent interactions in this light as it is reflected between physical boundaries within the wafer structure. As a result of these interactions, an interference fringe pattern would normally be formed on the illuminated surface of the wafer for each sequentially projected beam and, consequently, for each wavelength. However, prior to projecting the monochromatic light beams onto the wafer surface, the wafer is deformed into a reflective condenser. Thus, each sequentially projected monochromatic light beam is reflected off the deformed wafer with no interference fringe pattern being formed on the illuminated surface of the wafer. However, an image of an interference fringe pattern is contained in each reflected monochromatic light beam.

Each reflected monochromatic light beam is collected by a lens system that projects each corresponding interference fringe pattern image onto, for example, a detector array of a charge coupled device (CCD) camera, where each of these images are then captured in full aperture. The interference fringe pattern images are captured by digitizing pixels in the CCD camera detector array that correspond to each projected interference fringe pattern image present. A reflectance map of the entire wafer surface is then generated from this captured interference fringe pattern image. Several reflectance maps are generated from each measured wafer to eliminate thickness ambiguities which can result from thin film layers having phase thicknesses greater than $2\pi$.

The reference reflectance data for a wafer can be obtained by a theoretical calculation or through the use of a calibration wafer. The theoretical method consists of numerically computing reference reflectance characteristics based on assumed values for the intrinsic optical properties of the wafer materials. Alternatively, a calibration wafer, having a known thin film layer thickness profile, can be constructed from the same batch of materials used to construct the wafer to be measured. By subjecting this calibration wafer to the measuring method of the present invention, reference reflectance data is accurately obtained.

The comparison between the measured reflectance data and the reference reflectance data is performed by a computer. Upon performing this comparison, the computer provides a mapping of thin film layer thicknesses or a mapping of thin film layer thickness non-uniformities over the full aperture of the wafer.

A primary objective of the present invention is to provide an efficient means for measuring thin film layer thickness.

Other objects and advantages of the present invention will become apparent to those skilled in the art from the following detailed description read in conjunction with the appended claims and the drawings attached hereto.

DETAILED DESCRIPTION OF THE INVENTION

Figure 1:
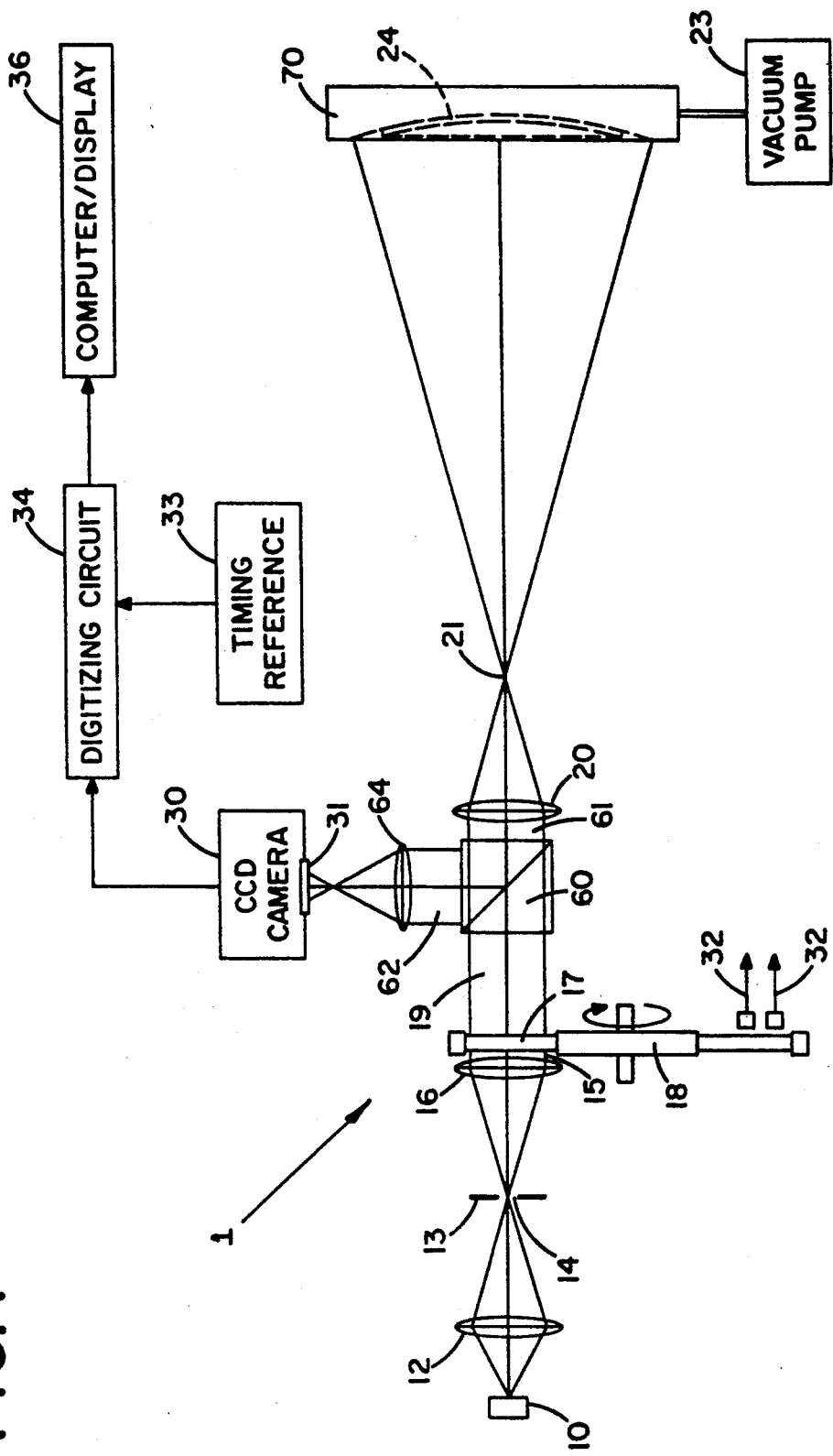
FIG. 1 is a schematic representation of an on-axis semiconductor wafer thin film layer thickness measuring instrument.

An apparatus for measuring a thin film layer thickness of a semiconductor wafer 24 is shown in FIG. 1 generally indicated by the numeral 1. For the purposes of this description, the measurement of an outer silicon layer thickness of a SOI semiconductor wafer 24 is described.

The apparatus 1 provides a spatial filtered white light source that includes a plate 13 having a circular aperture 14 that is illuminated by a halogen lamp 10 through a condensing lens 12. Light passing through aperture 14 impinges on a collimator lens 16 to form a beam 15 of collimated light. The size of the aperture 14 determines the field angle in the collimated light sections of the apparatus 1, and the orientation of the aperture 14 is chosen to allow an aperture image to be projected onto the SOI wafer 24. It should be noted that the condensing lens 12 may be replaced by a fiber optic light guide.

The collimated beam 15 produced by the white light source and the collimator lens 16 is spectrally filtered by a series of narrow band filters 17, nominally of 30 to 50 Å half bandwidth. The series of filters 17 are placed around the periphery of a rotating filter wheel assembly 18, whereby a corresponding series of collimated monochromatic light beams 19 are produced. The wavelengths of these collimated monochromatic light beams 19 typically range from 550 nm to 950 nm. Locating the filter wheel assembly 18 in the path of the collimated beam 15 minimizes the spectral broadening of the filtered beam 19 caused by the field angle defined by the size of the aperture 14. A pair of electronic signals 32 are generated by the filter wheel assembly 18 to serve as a timing reference 33 for a digitizing circuit 34. One of these signals indicates the beginning of a filter wheel revolution, whereas the other signal indicates the beginning of each filter period. Each of the collimated monochromatic light beams 19 is directed toward an on-axis beam splitter 60 where a portion 61 of each collimated monochromatic light beam is transmitted toward a second collimator lens 20.

The second collimator lens 20 focuses the transmitted portion 61 of each collimated monochromatic light beam to a point 21 in the focal plane of the second collimator lens 20. This focal point 21 directly corresponds to the origin 21 of the radius of curvature of a spherically shaped vacuum chuck 70. The spherically shaped vacuum chuck 70 serves to deform the SOI wafer 24 into a spherically shaped reflective condenser. Thus, when the deformed SOI wafer 24 is illuminated with a monochromatic light beam that is focused at the focal point 21 of the second collimator lens 20, or the radius of curvature origin 21 of the vacuum chuck 70, this light beam is reflected back to the focal point 21, or origin 21, respectively.

Figure 2:
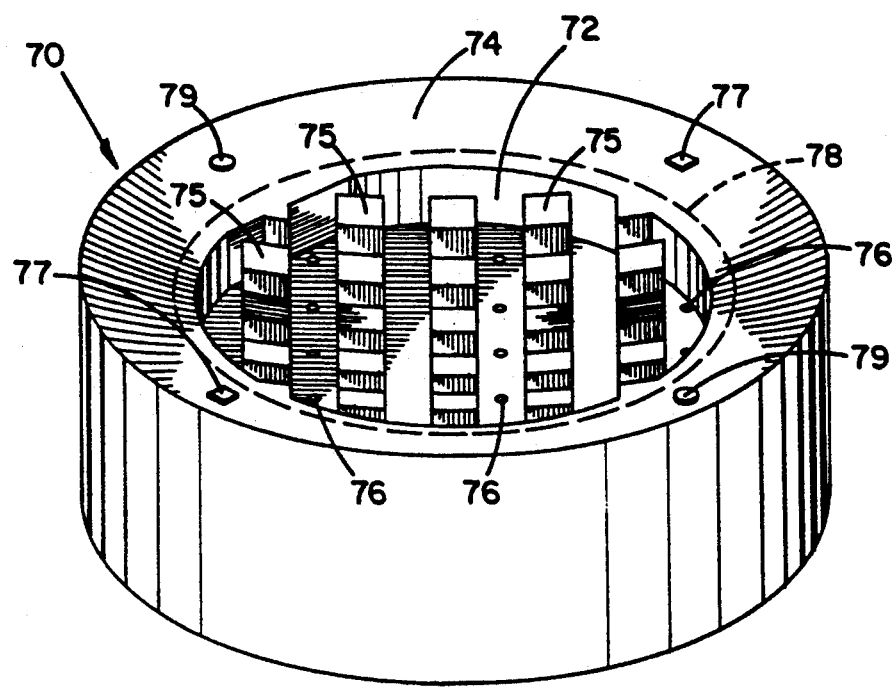
FIG. 2 is a perspective view of a bed-of-nails type of spherically shaped vacuum chuck.

The spherically shaped vacuum chuck 70 deforms the SOI wafer 24 through the use of a vacuum pump 23. This vacuum pump 23 provides a suction to which the SOI wafer 24 adheres. Referring to FIG. 2, there is illustrated in greater detail one type of the spherically shaped vacuum chuck 70 shown in FIG. 1. This type of vacuum chuck 70 can be fabricated from aluminum or any other type of non-porous material, and has a pattern, generally indicated by numeral 72, of raised lands 75 circumferentially surrounded by a smooth surface 74. This raised lands pattern 72, also known as a "bed-of nails", and the smooth surface 74 have a desired spherical curvature radius. Several peripheral vacuum ports 76 are located between the lands 75 of the pattern 72 to allow a wafer to be suctioned down onto the tops of the lands 75. Typically a 4.0 inch diameter wafer must be deformed at its center by approximately 1.25 millimeters to create a 1 meter radius of curvature reflective condenser. Similarly, an 8.0 inch diameter wafer must be deformed by approximately 5 millimeters. Deforming an SOI wafer in such a manner does not produce significant stress in the wafer and will not cause debonding between the layers of the wafer. An outline 78 of a wafer is shown to extend outside the raised lands pattern 72 and onto the smooth surface 74 so as to ensure a secure vacuum seal. A wafer typically extends outside the raised lands pattern 72 by approximately 1 millimeter. Also shown in FIG. 2, is a pair of reference alignmentt marks 77 and a pair of reference reflecting surfaces 79 placed on the smooth surface 74. These references 77, 79 provide for aiding wafer alignment and for establishing a reflectance standard, respectively, as will be explained.

Figure 3:
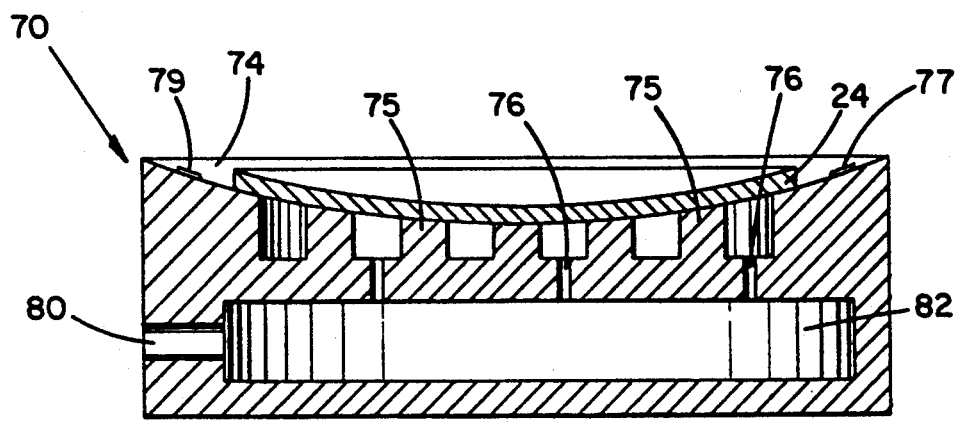
FIG. 3 is a cross-sectional view of a bed-of-nails type of spherically shaped vacuum chuck in the process of deforming a wafer.

Turning now to FIG. 3, the spherically shaped vacuum chuck 70 is shown in the process of deforming the wafer 24. A main vacuum port 80 provides access to the peripheral vacuum ports 76 by way of a vacuum chamber 82. The main vacuum port 80 is connected to the vacuum pump 23 shown in FIG. 1, thereby providing the suction to maintain the wafer 24 in its spherically deformed position.

Figure 4:
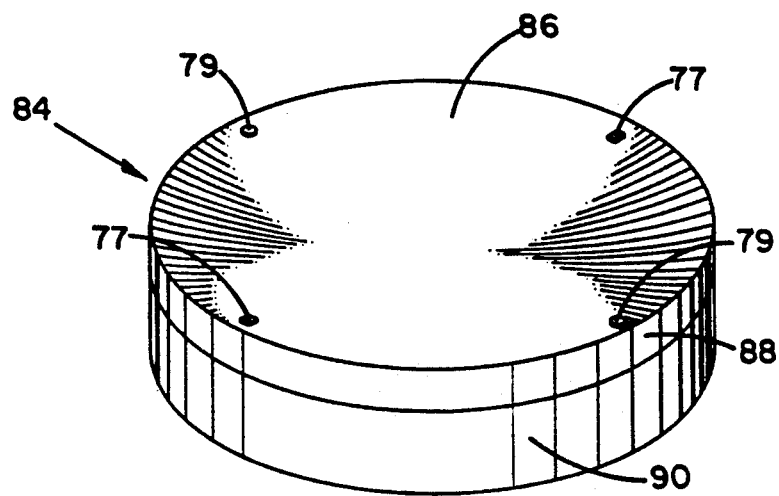
FIG. 4 is a perspective view of a porous material type of spherically shaped vacuum chuck.
Figure 5:
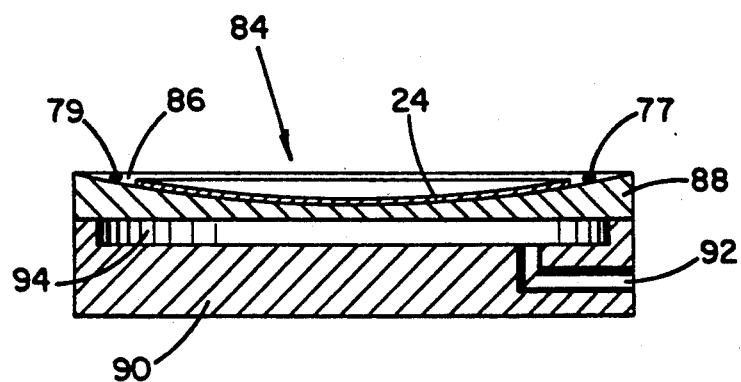
FIG. 5 is a cross-sectional view of a porous material type of spherically shaped vacuum chuck in the process of deforming a wafer.

The spherically shaped vacuum chuck 70 of FIGS. 2 and 3 can be replaced by other wafer holding means such as a spherically shaped vacuum chuck 84 made of porous material, as shown in FIGS. 4 and 5. This type of vacuum chuck 84 can be fabricated from ceramic or any other type of rigid porous material. A block 88 of such rigid porous material has a surface 86 with a desired spherical curvature radius. This rigid porous material block 88 is bonded to a non-porous material base 90. As shown in FIG. 5, the non-porous material base 90 maintains a vacuum port 92 that allows access to a vacuum chamber 94. Since the rigid porous material block 88 is gas permeable, a wafer 24 placed on the surface 86 of the block 88 can be spherically deformed to the curvature radius of the block surface 86 by creating a vacuum in the vacuum chamber 94. Such a vacuum is created when the vacuum port 92 is connected to the vacuum pump 23 shown in FIG. 1.

Figure 6:
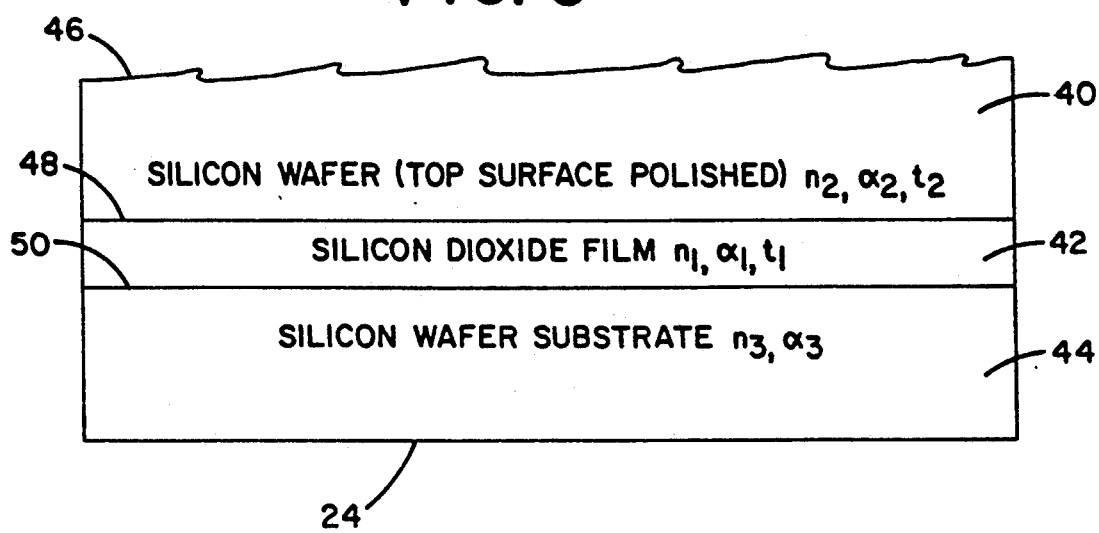
FIG. 6 is a greatly enlarged illustration of the various layers of a SOI semiconductor wafer.

Referring to FIG. 6, a SOI semiconductor wafer 24 is shown constructed in a sandwich structure comprising a mechanically polished outer silicon layer 40, an internal silicon dioxide ($SiO_2$) film 42, and a silicon wafer substrate 44. This sandwich structure creates three interfaces 46, 48, 50 from which light, incident upon the outer silicon layer 40, may be reflected. The reflectance characteristics of these interfaces 46, 48, 50 are based upon the intrinsic optical and physical properties of the materials in each layer 40, 42, 44 of the SOI wafer 24. These properties comprise of the absorption coefficient ($\alpha$) the index of refraction (n) and the thickness (t) of the material layers 40, 42, 44. For an SOI wafer, it is assumed that the absorption coefficient, ($\alpha_1$), of the $SiO_2$ layer 42 is zero. However, in general, it is permissible that the absorption coefficient be non-zero, provided that it is known.

When the SOI wafer 24 is installed in the apparatus 1 of FIG. 1 and the surface 46 of the SOI wafer 24 is illuminated with a monochromatic light beam that is focused at the vacuum chuck's radius of curvature origin 21, and hence the SOI wafer's radius of curvature origin 21, a series of coherent interactions occur as this light is reflected between the three material interfaces 46, 48, 50 of the SOI wafer structure 24. These interactions produce a wavelength dependent interference fringe pattern image that is contained in the monochromatic light beam that is reflected back to the radius of curvature origin 21. The reflectance at any point on the wafer is determined by the multiple reflections between the three surfaces and by the magnitudes of their physical properties, $n_1,\alpha_1,t_1,n_2,\alpha_2, t_2,n_3,\alpha_3$. In the unique case of an SOI wafer structure, the substrate indices ($n_3,\alpha_3$) are identical to those of the outer silicon layer indices ($n_2,\alpha_2$) since both are fabricated from single crystal silicon. The wafer reflectance at any wavelength can be calculated explicitly as a function of the outer silicon layer thickness if all the other parameters are known, however, the reverse problem of computing the thickness from a single measured reflectance is ambiguous. This ambiguity is created by the fact that as the outer silicon layer thickness is increased, the measured reflectance cycles between maximum and minimum values as the phase thickness ($n_2 t_2$) increases by multiples of $\pi/4$. This multiple values problem clearly makes the computation of the value of $t_2$ from a single reflectance measurement impossible. The use of multiple wavelength measurements can in principle overcome the multiple values problem, but the wavelength dependent behavior of the material properties must be very accurately known or otherwise large errors occur in the thickness computations.

An alternate approach for overcoming the multiple values problem is a statistical one, wherein measured reflectance data at several wavelengths is compared on a least squares best fit basis with a library of computed spectral data at the same wavelengths. In the case of an SOI wafer, the library of spectra is computed for all values of the outer silicon layer thickness and the selection is made by choosing that outer silicon layer thickness which minimizes the least squares best fit.

Referring again to FIG. 1, the reflected monochromatic light beam containing the wavelength dependent interference fringe pattern image is collected by the second collimator lens 20 and directed toward the on-axis beam splitter 60. The beam splitter 60 redirects a portion 62 of the now collimated monochromatic light beam 61 to a final collimator lens 64. This final collimator lens 64 converges the redirected portion 62 of the collimated monochromatic light beam onto a CCD camera detector array 31 where the wavelength dependent interference fringe pattern image contained in the reflected monochromatic light beam is displayed. It should be noted that the filter wheel assembly 18 can alternatively be placed in the collimated beam 62 redirected by the beam splitter 60, instead of in the collimated beam 15 generated by the collimator lens 16, provided that the field angle can be tolerated by the narrow band filters 17.

Figure 7:
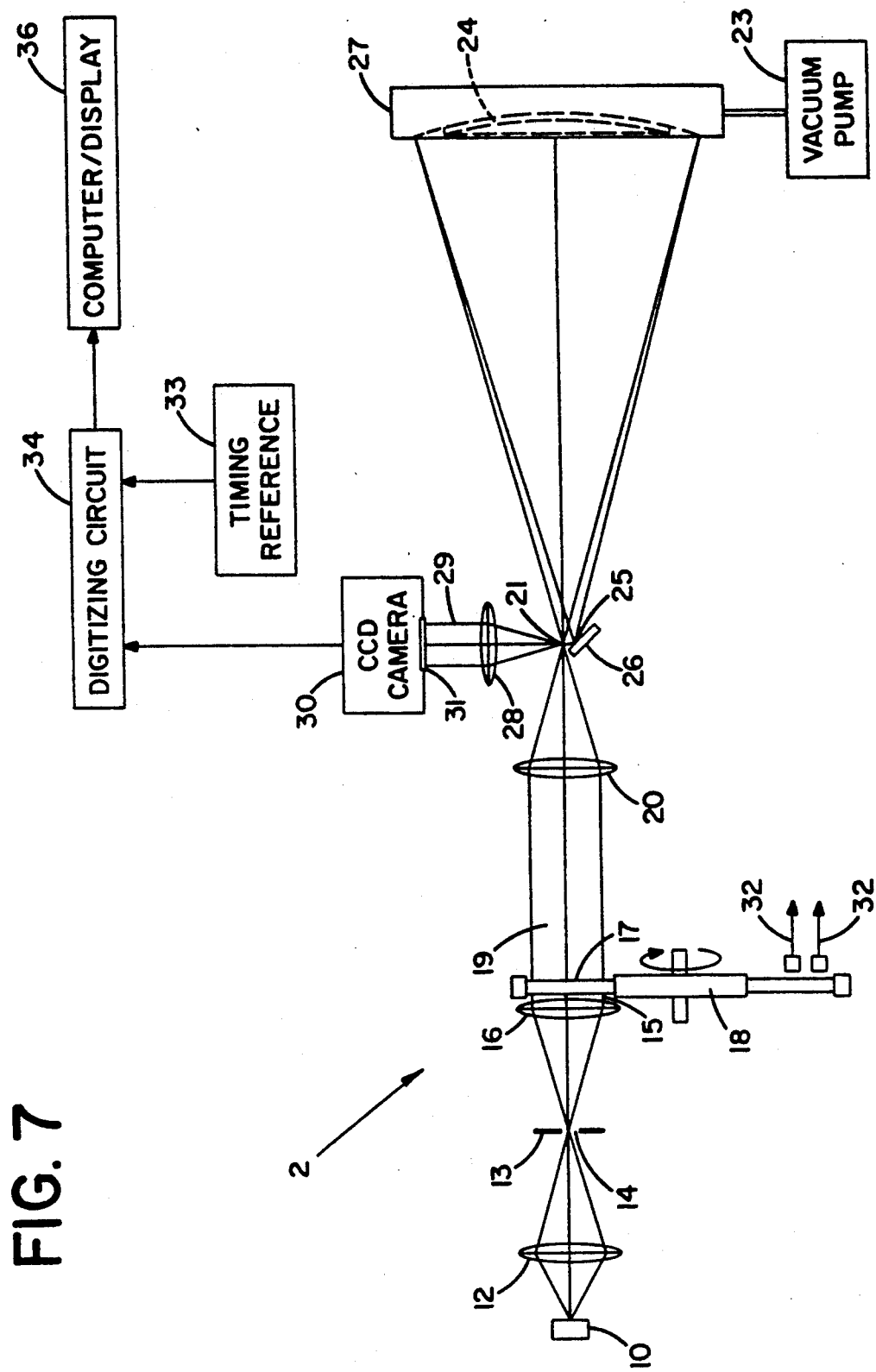
FIG. 7 is a schematic representation of an off-axis semiconductor wafer thin film layer thickness measuring instrument.

An apparatus 2 for providing an alternate method of displaying the wavelength dependent interference fringe pattern image on the CCD camera detector array 31 is shown in FIG. 7. In this scheme, the vacuum chuck 27 can be identical to the vacuum chucks 70, 84 of FIGS. 2 and 3 and FIGS. 4 and 5, respectively, except that it has an ellipsoidally shaped surface, thereby allowing the monochromatic light beam containing the wavelength dependent interference fringe pattern image to be reflected to an off-axis mirror 26. This mirror 26 is positioned at the origin 25 of the radius of curvature of the ellipsoidally shaped vacuum chuck 27, which is also a point 25 in the focal plane of a final collimator lens 28. Thus, the reflected monochromatic light beam containing the wavelength dependent interference fringe pattern image is redirected by the off-axis mirror 26 to the final collimator lens 28. The final collimator lens 28 then projects a collimated monochromatic light beam 29 onto the CCD camera detector array 31 whereby the wavelength dependent interference fringe pattern image is displayed. It should be noted that, as before, the filter wheel assembly 18 can alternatively be placed in the collimated beam 29 provided that the field angle can be tolerated by the narrow band filters 17. It should also be noted that in this apparatus 2 a monochromator can replace the halogen lamp 10, the condensing lens 12, the first two collimator lenses 16, 20, and the narrow band filter wheel 18, provided that the slewing rate of the monochromator between different wavelengths is sufficiently high; up to twenty different wavelengths in less than one second.

The determination of the method used to display the wavelength dependent interference fringe pattern image on the CCD camera detector array 21 is dependent upon the beam intensity that is required to maintain a suitably displayed wavelength dependent interference fringe pattern image. The use of the on-axis beam splitter method results in decreased beam intensity due to optical losses that are inherent to beam splitters. The alternate off-axis mirror method eliminates the need for a beam splitters, thereby improving the optical throughput by a factor of 4. Thus, if the wavelength dependent interference fringe pattern image is not suitably displayed using the on-axis beam splitter method, then the off-axis mirror method must be used.

Figure 8:
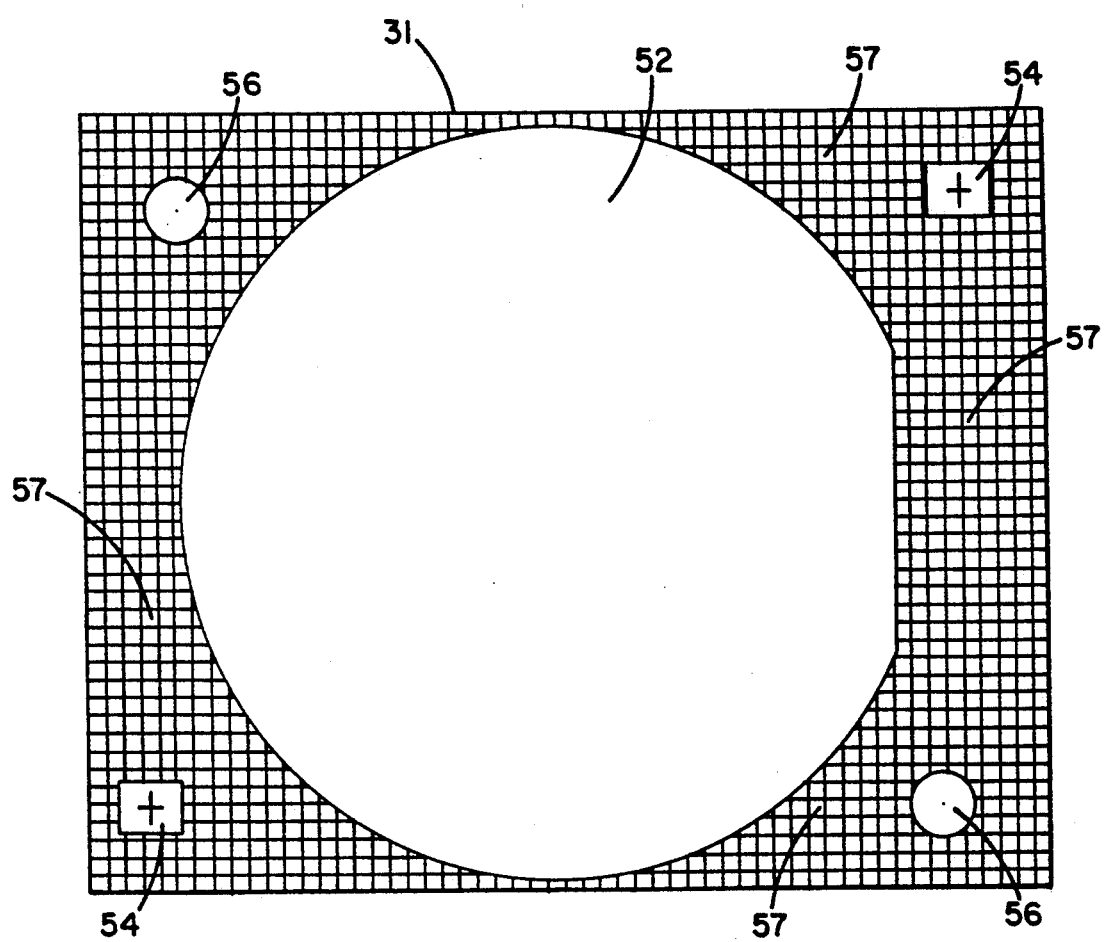
FIG. 8 is a plan view of a CCD camera detector array showing a wafer image outline and several reference surface image outlines.

Referring to FIG. 8, the CCD camera detector array 31 is shown with an SOI wafer image outline 52, a pair of reference alignment image outlines 54, and a pair of reference reflecting image outlines 56, projected upon its surface. These reference images 54, 56 are formed by the reference alignment marks 77 and reference reflecting surfaces 79 on the surfaces 74, 86 of the vacuum chucks 70, 84, respectively. When illuminated with a monochromatic light beam that is focused at the vacuum chuck radius of curvature origin 21, these references 77, 79 provide reflections from their surfaces. Similar to the SOI wafer wavelength dependent interference fringe pattern image, images of these references 77, 79 are contained in the reflected monochromatic light beam, whereby they are eventually projected onto the CCD camera detector array 31. The reference alignment marks 77 provide aid in wafer alignment, whereas the reference reflecting surfaces 79 serve to normalize the CCD signals so that actual wafer reflectance can be calculated. As shown, the CCD detector array 31 is made up of a plurality of CCD pixels 57.

Referring back to FIG. 1, the wavelength dependent interference fringe pattern image that is displayed on the CCD camera detector array 31 is captured by the CCD camera 30. A reflectance map is generated by digitizing the CCD pixels 57 that correspond to each displayed wavelength dependent interference fringe pattern image through the use of a digitizing circuit 34. This raw reflectance data can be normalized to eliminate variations in CCD pixel sensitivity and can be reduced in size by averaging signals over blocks of CCD pixels 57 to match the spatial limitations of any subsequent chemical micropolishing process. In determining the thickness ($t_2$) of the outer silicon layer 40 of the SOI wafer 24, either a numerical computation method or a SOI calibration wafer may be used. Both of these methods typically require the use of a computer 36.

The numerical method of determining outer silicon layer thickness ($t_2$) includes assuming values for the thin film constants $n_1$, $\alpha_1$, $t_1$, $n_2$, $\alpha_2$, $n_3$, and $\alpha_3$, and calculating spectral reflectances for a set of wavelengths corresponding to the monochromatic light produced by the filtered white light source. This calculation is done for a number of different outer silicon layer thicknesses ($t_2$) and, provided that the initial thin film constant assumptions are correct, should only need to be computed once. This calculation provides sets of reflectance values, $R_c(\lambda_1, \lambda_2, \ldots \lambda_n, t_2)$, for thicknesses ranging from the thinnest to the thickest estimated value of the outer silicon layer. These computed spectral reflectance are then compared with the measured reflectance data, $R_m(\lambda_1, \lambda_2, \ldots \lambda_n, t_2)$, at specific points on the wafer using a root mean square (rms) merit function of the form, $$M(x,y,t_2) = \left[ \frac{1}{nmax} \left[ \sum_{n=1}^{nmax} [R_m(x,y,\lambda_n) - R_c(\lambda_n,t_2)]^2 \right] \right]^{\frac{1}{2}}$$

This merit function is evaluated for different values of $t_2$ until a minimum or best match is found, which in turn indicates the most likely thickness. Of course, other pattern matching merit functions can be used if desired.

Unknown variations in any of the assumed thin film constants may cause errors to propagate through the computation process as outer silicon layer thickness errors. Such first order error sources include the lack of knowledge of the thickness ($t_1$) of the $SiO_2$ layer 42 over the wafer aperture and the dispersive effects of the silicon index of refraction ($n_1$). If the value of the merit function is too large, indicating a poor match, then new computed spectral reflectances will have to be generated for a closer set of $t_2$ thicknesses, iterated with the absorption coefficients ($\alpha_2,\alpha_3$) and the indices of refraction ($n_2,n_3$) of the outer silicon layer 40 and the silicon substrate 44, respectively, or the index of refraction ($n_1$) and the thickness ($t_1$) of the $SiO_2$ layer 42.

Figure 9:
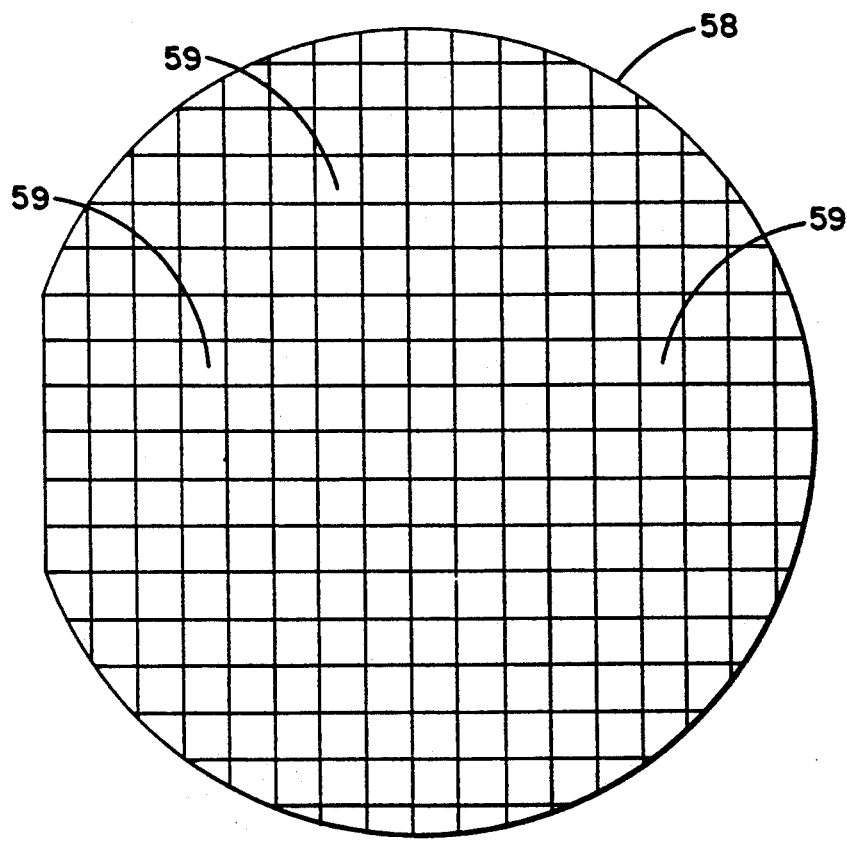
FIG. 9 is a plan view of a SOI semiconductor calibration wafer having a stepped outer silicon layer surface.

The second method of determining outer silicon layer thickness is to generate a set of spectral reflectances from a SOI calibration wafer 58 having a stepped outer surface, as shown in FIG. 9, wherein each square area 59 of the wafer has a different known outer silicon layer thickness. It is preferred that the wafer have at least 500 reference squares to cover the likely range of outer silicon layer thicknesses. This wafer 58 can be calibrated for outer silicon layer thicknesses down to zero silicon thickness by using a stylus profilometer. The calibration wafer 58 is manufactured from the same batch of materials and is subject to the same manufacturing conditions as the wafer 24 under measurement. Consequently, the intrinsic optical properties of the calibration wafer such as the absorption coefficient and the index of refraction, and also the dispersive behavior should match those of the wafer 24 being tested.

The spectral reflectances of the calibration wafer 58 are obtained by subjecting this wafer to the measuring method of the present invention. These spectral reflectances are stored in the computer 36 and are used as a reference for comparison with the spectral reflectance of a measured SOI wafer 24. The calibration wafer 58 has reference reflectances for at least 500 different outer silicon layer thicknesses and the reference reflectance that most closely matches the reflectance at any point on the surface of the measured SOI wafer 24 indicates the outer silicon layer thickness at that point.

Although both of these methods meet the objective of providing a 400 point measurement of outer silicon layer thickness in less than 60 seconds, the calibration wafer method is potentially more accurate than the numerical approach due to the similarity of the intrinsic optical properties between the calibration wafer 58 and the SOI wafer 24 to be measured. However, the calibration wafer method would require on-line production capability to generate a new calibration wafer 58 if the basic wafer process is significantly altered.

It is thus seen that the objectives set forth above are efficiently attained and, since certain changes can be made in the above described apparatuses and methods without departing from the scope of the invention, it is intended that all matter contained in the above description or shown in the accompanying drawings shall be interpreted as illustrative and not in a limiting sense.

What is claimed is:

1. An apparatus for measuring the thickness of a layer of material having front and rear surfaces, wherein said material of said layer has a property that allows radiation to be transmitted therethrough, said apparatus comprising:
   means for deforming said layer of material into a reflective condenser;
   means for irradiating said front surface of said deformed layer of material with monochromatic radiation, wherein said monochromatic radiation is reflected from said front and rear surfaces of said deformed layer of material having characteristics that correspond to the thickness of said layer of material;
   means for receiving said reflected monochromatic radiation and for detecting said characteristics; and
   means for comparing said detected characteristics of said received reflected monochromatic radiation with a set of reference characteristics that correspond to known thicknesses and for providing an output that corresponds to the thickness of said layer of material.

2. The apparatus as defined in claim 1, wherein said means for deforming comprises means for deforming the shape of said layer of material into a reflective condenser with a specific curvature, whereby said reflective condenser reflects said monochromatic radiation that irradiates said front surface of said deformed layer of material.

3. The apparatus as defined in claim 2, wherein said means for deforming comprises a spherically shaped vacuum chuck with a constant radius of curvature, whereby said spherically shaped vacuum chuck deforms said layer of material into a spherically shaped reflective condenser with said constant radius of curvature.

4. The apparatus as defined in claim 3, wherein said spherically shaped vacuum chuck is fabricated from a non-porous type of material having a pattern of raised lands therein and a plurality of peripheral vacuum ports therethrough, and wherein a vacuum suction is applied to said plurality of peripheral vacuum ports so as to deform said layer of material.

5. The apparatus as defined in claim 3, wherein said spherically shaped vacuum chuck is fabricated from a porous type of material, wherein said porous type of material is gas permeable, and wherein a vacuum suction is applied to one area of said porous material such that said layer of material adheres to another area of said porous material so as to deform said layer of material.

6. The apparatus as defined in claim 2, wherein said means for deforming comprises an ellipsoidally shaped vacuum chuck with a specific radius of curvature, whereby said ellipsoidally shaped vacuum chuck deforms said layer of material into a ellipsoidally shaped reflective condenser with said specific radius of curvature.

7. The apparatus as defined claim 6, wherein said ellipsoidally shaped vacuum chuck is fabricated from a non-porous type of material having a pattern of raised lands therein and a plurality of peripheral vacuum ports therethrough, and wherein a vacuum suction is applied to said plurality of peripheral vacuum ports so as to deform said layer of material.

8. The apparatus as defined in claim 6, wherein said ellipsoidally shaped vacuum chuck is fabricated from a porous type of material, wherein said porous type of material is gas permeable, and wherein a vacuum suction is applied to one area of said porous material such that said layer of material adheres to another area of said porous material so as to deform said layer of material.

9. The apparatus as defined in claim 1, wherein said means for irradiating comprises means for irradiating said front surface of said layer of material with visible light.

10. The apparatus as defined in claim 9, wherein said means for irradiating with visible light comprises means for sequentially irradiating said front surface with visible monochromatic light of differing wavelengths, such that ambiguities that arise when the thickness of said layer of material is a multiple of one of said differing wavelengths are eliminated.

11. The apparatus as defined in claim 10, wherein said means for sequentially irradiating with visible monochromatic light of differing wavelengths comprises:
    a white light source;
    means for collimating said white light into a collimated beam;
    a plurality of narrow band filters for passing different wavelengths;
    means for sequentially placing said narrow band filters one at a time into said collimated beam to form a collimated monochromatic beam; and
    means for focusing said collimated monochromatic beam to the radius of curvature origin of said deformed layer of material, thereby directing said focused monochromatic beam onto said front surface of said deformed layer of material.

12. The apparatus as defined in claim 11, wherein said means for sequentially placing said narrow band filters comprises a rotatable filter wheel assembly.

13. The apparatus as defined in claim 12, additionally comprising electronic sensors associated with said rotatable filter wheel assembly for providing electrical outputs indicative of each rotation of said filter wheel and a beginning of each narrow band filter period.

14. The apparatus as defined in claim 10, wherein said means for sequentially irradiating with visible monochromatic light of differing wavelengths comprises a monochromator.

15. The apparatus as defined in claim 1, wherein said means for irradiating said front surface of said layer of material with monochromatic radiation comprises:
    a source of white light;
    means for focusing said white light into a focused beam directed onto said front surface of said deformed layer of material; and
    means for passing only one selected wavelength of monochromatic radiation at a time.

16. The apparatus as defined in claim 15, wherein said means for passing only one selected wavelength comprises a rotatable filter wheel assembly.

17. The apparatus as defined in claim 1, wherein said means for irradiating comprises a monochromator.

18. The apparatus as defined in claim 1, wherein said means for receiving said reflected radiation and for detecting said characteristics comprises a charge coupled device.

19. The apparatus as defined in claim 1, wherein said set of reference characteristics used in said means for comparing said detected characteristics is computed based on predetermined thicknesses and assumed optical properties of said material of said layer.

20. The apparatus as defined in claim 19, wherein said means for comparing includes a computer having said set of reference characteristics stored therein.

21. The apparatus as defined in claim 1, wherein said set of reference characteristics used in said means for comparing said detected characteristics is obtained by storing characteristics derived from a layer of material having a plurality of known thicknesses.

22. The apparatus as defined in claim 21, wherein said means for comparing comprises a computer having said set of reference characteristics stored therein.

23. The apparatus as defined in claim 1, wherein said layer of material is one of a plurality of thin film layers formed on a substrate.

24. The apparatus as defined in claim 23, wherein said other thin film layers have properties that allow radiation to be transmitted, wherein said substrate has a property that allows radiation to be reflected, and wherein said radiation is reflected from said front and rear surfaces of said layer of material, from front and rear surfaces of said other thin film layers, and from a front surface of said substrate.

25. The apparatus as defined in claim 24, wherein said material of said layer to be measured comprises silicon and said substrate comprises silicon.

26. The apparatus as defined in claim 1, wherein said characteristics comprise an interference fringe pattern.

27. The apparatus as defined in claim 1, wherein said front surface of said layer of material includes a full aperture surface area of said front surface of said layer of material, wherein said means for irradiating said front surface irradiates said full aperture surface area with a single beam of monochromatic radiation, wherein said means for receiving said reflected radiation and for detecting said characteristics comprises means for receiving and detecting said characteristics from said radiation reflected from said full aperture surface area, and wherein said means for comparing provides an output that corresponds to a thickness map of said full aperture surface area.

28. The apparatus as defined in claim 27, wherein said layer of material is formed on a front surface of a wafer, wherein said wafer is deformed into a reflective condenser, and wherein said means for irradiating includes:
a source of white light;
means for spatial filtering said white light source;
means for collimating said spatial filtered white light to form a collimated beam;
means placed in said collimated beam for producing collimated monochromatic light from said white light; and
means for focusing said collimated monochromatic light to the radius of curvature origin of said deformed wafer, thereby directing said focused monochromatic light onto a full aperture surface area of said front surface of said deformed wafer.

29. The apparatus as defined in claim 28, wherein said means for receiving said reflected radiation and for detecting said characteristics comprises:
means for directing said reflected radiation from said full aperture surface area of said front surface of said deformed wafer and for generating a collimated beam; and
a charge coupled device camera positioned within said collimated beam for detecting said characteristics from said reflected radiation.

30. The apparatus as defined in claim 29, wherein said means for comparing said detected characteristics comprises:
means for digitizing an output signal of said charge coupled device camera; and
means for comparing said digitized output signal with a set of digitized signals corresponding to said reference characteristics.

31. The apparatus as defined in claim 28, wherein said means for receiving said reflected radiation and for detecting said characteristics comprises:
means for generating a collimated beam from said radiation reflected from said full aperture surface area of said deformed wafer;
a beam splitter positioned within said collimated beam for redirecting said reflected radiation;
a charge coupled device camera; and
means for focusing said redirected reflected radiation onto said charge coupled device camera.

32. The apparatus as defined in claim 31, wherein said means for comparing comprises:
means for digitizing an output signal of said charge coupled device camera; and
means for comparing said digitized output signal with a set of digitized signals corresponding to said reference characteristics.

33. The apparatus as defined in claim 28, wherein said characteristics corresponding to the thickness of said layer of material comprise an interference fringe pattern image contained in said monochromatic radiation reflected from said full aperture surface area of said front surface of said deformed wafer, and wherein said means for receiving said reflected radiation comprises a charge coupled device camera for capturing said interference fringe pattern image.

34. The apparatus as defined in claim 33, wherein said charge coupled device camera captures an interference fringe pattern image from reflected monochromatic radiation at a plurality of different wavelengths.

35. The apparatus as defined in claim 34, additionally comprising means placed along the same plane as said deformed wafer, wherein said means reflect radiation for alignment purposes and for establishing a reflectance standard.

36. The apparatus as defined in claim 35, wherein said means for comparing said detected characteristics of said received reflected monochromatic radiation comprises a calibration wafer having a layer of material formed on a front surface of said calibration wafer, wherein said layer of material has a plurality of different known thicknesses over said front surface, and wherein said plurality of different known thicknesses are measured and stored as said set of reference characteristics.

37. The apparatus as defined in claim 35, wherein the set of reference characteristics used in said means for comparing is computed based on predetermined thicknesses and assumed properties of said layer of material and said wafer.

38. An apparatus for measuring the thickness of a layer of material having a front and rear surface, wherein said layer is one of a possible plurality of layers each having a front and a rear surface and formed on a front surface of a substrate, and wherein said material of said layer has properties that allow light to be transmitted therethrough, said apparatus comprising:
means for deforming said layer of material, said possible plurality of other layers, and said substrate, such that a reflective condenser is formed from said front and rear surface of said layer of material, said front and rear surfaces of said possible plurality of other layers, and said front surface of said substrate;

means for providing a beam of collimated light;

means for converting said beam of collimated light into a beam of collimated monochromatic light;

means for focusing said beam of collimated monochromatic light so as to irradiate an entire front surface of said reflective condenser, said focused monochromatic light being reflected off said front and rear surfaces of said layer of material and said front and rear surfaces of said possible plurality of other layers and said front surface of said substrate, said reflected light interacting to form an interference fringe pattern image that is contained in a reflected monochromatic light beam;

means for directing said reflected monochromatic light beam onto a detector array of a charge coupled device camera so as to display said contained interference fringe pattern image, said camera providing an output corresponding to said displayed interference fringe pattern image that has been detected by said array;

means for digitizing said output of said charge coupled device camera; and means for receiving said digitized output of said charged coupled device camera and comparing said digitized output of said charge coupled device camera with stored reference reflectance data and providing an output corresponding to the thickness of said layer of material.

39. The apparatus as defined in claim 38, wherein said means for deforming comprises a vacuum chuck.

40. The apparatus as defined in claim 38, wherein said means for directing said reflected monochromatic light beam onto said detector array of said charge coupled device camera comprises a mirror and a collimating lens.

41. The apparatus as defined in claim 38, wherein said reflected monochromatic light beam returns through said means for focusing said beam of collimated monochromatic light, wherein said means for directing said reflected monochromatic light beam onto a detector array of a change coupled device camera comprises a beam splitter and a focusing lens, and wherein said beam splitter is positioned within said beam of collimated monochromatic light.

42. A method for measuring the thickness of a layer of material, said method comprising the steps of:

providing a layer of material having front and rear surfaces, said material of said layer having properties that allow radiation to be transmitted therethrough;

deforming said layer of material into a reflective condenser;

irradiating said front surface of said deformed layer of material with monochromatic radiation, wherein said monochromatic radiation is reflected from said front and rear surfaces of said deformed layer of material having characteristics corresponding to the thickness of said layer of material;

receiving said reflected radiation;

detecting said characteristics of said received reflected radiation;

comparing said detected characteristics of said received reflected radiation with a set of reference characteristics corresponding to known thicknesses; and providing an output corresponding to the thickness of said layer of material based on said comparison of said detected characteristics with said set of reference characteristics.

43. The method as defined in claim 42, wherein said step of deforming said layer of material comprises the step of deforming said layer of material into a spherically shaped reflective condenser by a spherically shaped vacuum chuck, such that monochromatic radiation irradiating said front surface of said reflective condenser is reflected on-axis to be received.

44. The method as defined in claim 42, wherein said step of deforming said layer of material comprises the step of deforming said layer of material into an ellipsoidally shaped reflective condenser by an ellipsoidally shaped vacuum chuck, such that said monochromatic radiation irradiating said front surface of said reflective condenser is reflected off-axis to be received.

45. The method as defined in claim 42, wherein said step of irradiating comprises the step of sequentially irradiating said front surface with monochromatic radiation of differing wavelengths, such that ambiguities, arising when the thickness of said layer of material is a multiple of one said differing wavelengths, are eliminated.

46. The method as defined in claim 45, wherein said step of irradiating includes the steps of:

generating a white light;

forming a collimated beam of said white light; and filtering said collimated white light beam to generate collimated monochromatic light beams of differing narrow band wavelengths.

47. The method as defined in claim 42, additionally comprising the step of computing said set of reference characteristics based on predetermined thicknesses and assumed optical properties of said layer of material, and storing said set of reference characteristics.

48. The method as defined in claim 42, additionally comprising the steps of:

providing a reference layer of material having areas of known thickness;

measuring said thickness characteristics of said reference layer of material in said areas known thickness; and storing said measured thickness characteristics as said set of reference characteristics.

49. The method as defined in claim 42, wherein said step of irradiating includes the step of simultaneously irradiating the entire front surface of said deformed layer of material with a single beam of monochromatic radiation, and wherein said step of providing an output comprises the step of providing an output corresponding to a thickness map of said entire front surface of said layer of material.

50. The method as defined in claim 42, wherein said step of detecting said characteristics comprises detecting said characteristics using a charge coupled device camera, wherein said camera provides output signals that correspond to said characteristics, and wherein said method includes the additional steps of:

digitizing said output signals provided by said charge coupled device camera; and comparing said digitized output signals with a set of digitized reference signals that correspond to said set of reference characteristics.

51. The method as defined in claim 50, wherein said detected characteristics is an interference fringe pattern image produced by coherent interactions in said monochromatic radiation as it is reflected within said deformed layer of material, wherein said interference fringe pattern image is contained in said reflected radiation, and wherein said charge coupled device camera measures said interference fringe pattern image at a plurality of different points to determine the thickness of said layer of material at said plurality of different points.

52. The method as defined in claim 42, additionally comprising the steps of:
  performing a chemical micropolishing process upon said front surface of said layer of material in accordance with said output corresponding to the thickness of said layer of material; and
  repeating the above mentioned steps sequentially until the thickness of said layer of material corresponds to a predetermined thickness.

* * * * *